United States Patent
Kalousek et al.

[15] 3,693,411
[45] Sept. 26, 1972

[54] APPARATUS FOR MEASURING THIXOTROPY

[72] Inventors: George L. Kalousek, 2395 Urban Drive, Lakewood, Colo. 80215; Phillip F. Enger, Arvada, Colo.

[22] Filed: March 18, 1971

[21] Appl. No.: 125,651

[52] U.S. Cl. ............................................. 73/59
[51] Int. Cl. ..................................... G01n 11/10
[58] Field of Search ......................... 73/59, 60, 54

[56] References Cited

UNITED STATES PATENTS

| | | | |
|---|---|---|---|
| 2,354,299 | 7/1944 | Bays | 73/59 |
| 2,410,385 | 10/1946 | Loukomsky et al. | 73/59 |

FOREIGN PATENTS OR APPLICATIONS

| | | | |
|---|---|---|---|
| 896,570 | 11/1953 | Germany | 73/60 |
| 917,098 | 8/1954 | Germany | 73/60 |

*Primary Examiner*—Louis R. Prince
*Assistant Examiner*—Joseph W. Roskos
*Attorney*—Ernest S. Cohen and Albert A. Kashinski

[57] ABSTRACT

Thixotropy is measured by analyzing a sample in two different states. First, the total load to break thixotropic set is determined. To achieve maximum rheopectic set before breaking the thixotropic set, a viscosimeter-type apparatus is loaded by impacting steel balls into a fixed container at regular intervals. Second, the minimum load to initiate flow is determined by vibrating the sample to break thixotropic set, while simultaneously loading a fixed container in the above manner. The two tests provide values for (1) the total load to shear the set sample, and (2) the minimum load to initiate flow. Algebraically, these values are combined into a thixotropic index.

5 Claims, 1 Drawing Figure

PATENTED SEP 26 1972 3,693,411
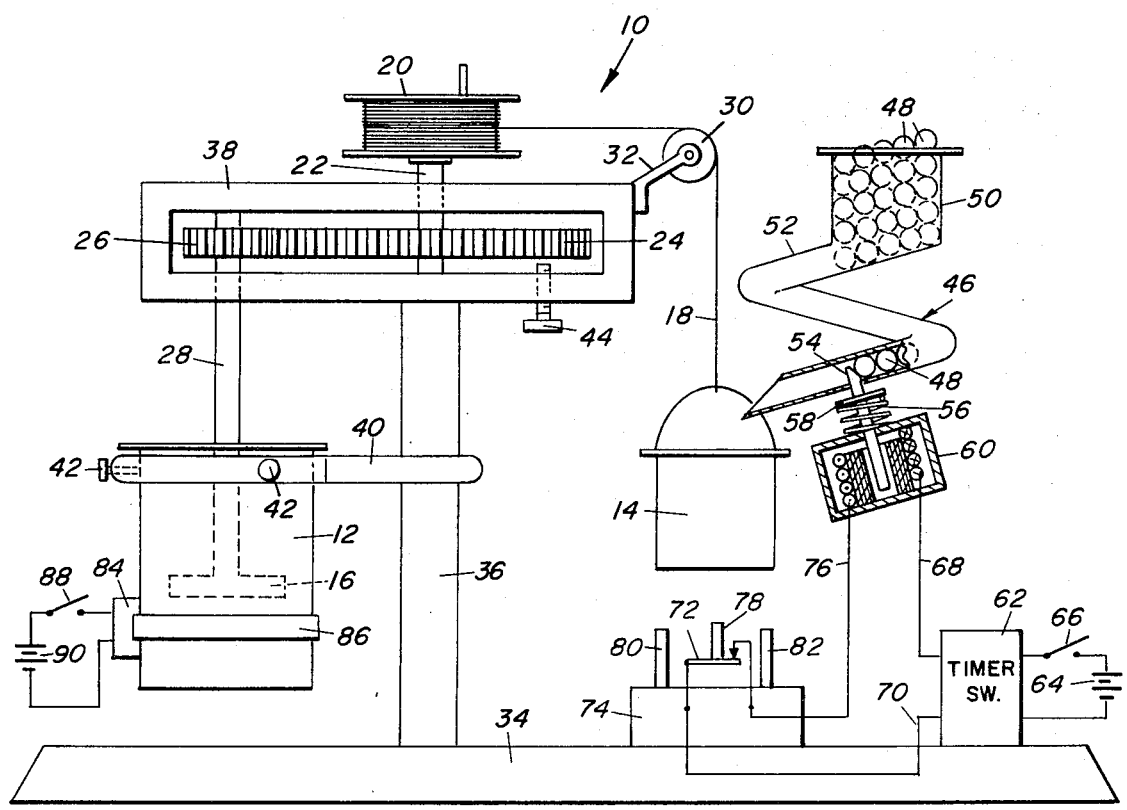
INVENTORS
GEORGE L. KALOUSEK
PHILLIP F. ENGER

APPARATUS FOR MEASURING THIXOTROPY

Background of the Invention

Thixotropy is a property exhibited by liquid suspensions of finely divided solids of becoming fluid when distributed and rigid when at rest. Rheopexy is a property of thixotropic suspensions of becoming increasingly rigid when agitated gently. Certain portland cements exhibit both thixotropy and rheopexy.

For construction purposes, portland cement is mixed with aggregate, sand and water to form concrete by chemical reaction. Occasionally, an abnormal set of the concrete occurs, evidenced by premature stiffening. Abnormal set is particularly troublesome where substantial time elapses between mixing and placing of the concrete. Excepting analysis of gypsum recrystallization, previous attempts to analyze abnormal set of concrete through empirical testing have generally been unsuccessful.

Thixotropy is one phenomenon that has been investigated as an indication of abnormal set in concrete. One such investigation is described in U.S. Department of the Interior, Bureau of Reclamation Concrete Laboratory Report No. C-721 using a conventional Stormer viscosimeter manufactured by Arthus Thomas Co. of Philadelphia Pennsylvania. Although tests performed with the viscosimeter clearly indicated a relationship between thixotropy and abnormal set, neither the method nor the instrument used was completely satisfactory for measuring quantitative thixotropy in cement slurries.

Because chemical hydration reactions rapidly alter cement grains, ordinary slurries of cement and water have been recognized as unsuitable for studying thixotropy. To avoid hydration, non-polar liquids such as reagent quality benzene have been substituted for water. Benzene slurries of this type have been tested by the prior art, but, again, the tests were unsuccessful. Loads necessary to shear the slurry varied from test to test for the same sample. It is against this background that our invention was made.

Summary of the Invention

Our invention is a thixometer – an instrument for measuring thixotropy. One application of our invention is determining abnormal set of portland cement. Because of the practical importance of thixotropy in cement, the following description explains the invention with reference to cement. Other thixotropic mixtures are equally applicable.

Slurries of non-polar liquids such as benzene and certain cements exhibit both thixotropic and rheopectic behavior. They become fluidic when shaken and are rigid at rest. Gentle agitation at rest increases their rigidity, but too much agitation results in fluidity. Since rigidity is an essential parameter of thixotropic behavior, uniform gentle agitation is an essential requirement of unvarying precision thixotropic measurement. A probable cause of this behavior is apparent from a theoretical analysis of the mechanisms of thixotropy.

The mechanism of thixotropic set is postulated as follows: It is assumed that interaction of opposite charges on different parts of adjoining cement grains is the cause. The degree of set depends upon the number of attractive bonds formed by charge interactions. Since cement grains are roughly spherical in shape, physical interference prevents free grain movement. Rotation of individual grains to positions of maximum bonding is impeded by adjacent grains. External energy must be transmitted into the slurry to cause grain rotation to positions establishing a maximum number of bonds. However, most low energy vibrations tend to fluidize rather than rigidify the slurry. Only extremely gentle agitation is capable of rheopectical compacting the slurry to a uniform and reproducible set. Our invention provides the necessary gentle agitation in an accurately reproducible manner.

Basically, our invention is a modified conventional viscosimeter. An essential feature of our invention is the manner in which a shearing load is transmitted to a test sample. In conventional viscosimetry, static weights are tethered on a cord to transmit shearing forces through a system of gears to a rotor blade immersed in a sample. Our invention substitutes precisely timed inertial loading for this static loading. inertial loading supplies the necessary gentle agitation to optimize rheopectic set in thixotropic measurements.

Another important feature of our invention is the use of a sample container vibrator to prevent thixotropic set while determining ordinary viscosity components which occur in combination with thixotropic effects. By determining the algebraic difference between static and vibrational loading requirements to produce shear, the true thixotropic effect is isolated. As a convenient measure of thixotropic behavior, a ratio of the algebraic difference of the two shear inducing loads divides by the total load is used. This ratio is designated the thixotropic index.

Therefore one object of our invention is an apparatus for measuring thixotropy by means of inertial loading.

Another object of our invention is an apparatus for measuring thixotropy by means of varying degrees of vibrational agitation.

These and other objects of our invention are inherent in this specification and drawing.

Brief Description of the Drawing

The sole FIGURE shows a side view, in partial section, of an apparatus for measuring thixotropy.

Description of the Preferred Embodiment

A thixometer 10 is shown in the sole Figure. The thixometer measures thixotropic characteristics of a sample slurry (not shown) carried in a sample container 12. Shearing forces are transmitted from a load container 14 to a rotor blade 16 immersed in the sample.

Shearing force from load container 14 is transmitted by a cord 18 wound on a reel 20, through an axle 22, through intermeshed gears 24–26, and finally through a shaft 28 terminating with rotor blade 16. To prevent frictional forces from interfering with measurements, shafts 22 and 28 rotate in suitable bearings (not shown) while cord 18 passes over a pulley 30, freely turning on a bracket 32. Each of these elements is supported on a rigid base 34 by an intermediate pedestal 36.

The force transmitting elements are arranged on a rectangular frame 38 at the top of the pedestal. Sample container 12 hangs below frame 38 on a rigid support 40 fixed to pedestal 36. Extending through an opening in the support, the sample container 12 is restrained by screws 42 at three spaced points (only two are shown) to achieve maximum vibrational freedom for the sample. On frame 38 a brake screw 44 co-operates with gear 24 to lock or release the force transmitting elements as required for operation of the thixometer.

To this point of description the individual elements and their arrangement duplicates the widely used Stormer viscosimeter. For measuring thixotropy, additional elements are required. Viscosity measurements are made with statically applied loads that become mobile in response to viscous flow of the sample fluid. Thixotropy measurements are enhanced by inertially loading small mass increments onto a static carrier. The carrier transfers the momentum of the mass increments into the thixotropic sample, causing gentle agitation which promotes rheopectic setting of the sample to uniform rigidity. By precisely timing the impact of the mass increments onto the carrier, uniform measurement is achieved. When the total load exceeds the shear force required to overcome internal forces within the sample, the inertially applied load becomes mobile, as in the case of viscosity measurement.

An inertial loader 46 is shown in the sole Figure adjacent to load container 14. The load container serves as the static carrier described above. Essentially, the loader, by gravity feed, meters small (0.5-inch-diameter, 8.44g) balls 48 which drop from a trough 50 through a spiral tube 52 and into the load container at regular intervals. Each time a ball strikes the container, part of its momentum is absorbed by the force transmitting elements 16–28 and transferred to the portion of the sample surrounding rotor blade 16. The resulting gentle agitation stimulates rheopectic setting. When the combined weight of the container and balls exceeds the thixotropic resistance of the sample, shear occurs, the load container displaces, and loading is stopped. This combined weight to break the thixotropic set is designated "total load."

Precision metering of steel balls 48 during the loading process is achieved by electro-mechanical control of loader 46. Near the discharge end of spiral tube 52 (shown partial section in the Figure) a movable detent 54, biased by a coil spring 56 acting against a shoulder 58, normally impedes the flow of balls. In response to electrical energy input to a solenoid 60, detent 54, which forms the solenoid core, withdraws from the tube to allow the balls to flow. When the current is removed the detent re-enters the tube and flow ceases.

Electrical control of solenoid 60 is assisted by a timer switch 62. Electrical power is provided by a battery 64 through an on-off switch 66. With switch 66 closed, an electrical signal appears at short regular intervals between the output leads 68 and 70 of timer switch 62. Through an intermediate, normally closed breaker switch 72 on a pedestal 74, and through a lead 76, the signal activates solenoid 60. The duration and intensity of the signal are adjustable to allow one steel ball 48 at a time to pass detent 54 in regular intervals, one each second for example. When sufficient balls have passed the detent to break the thixotropic set of the sample, the container decends onto a shaft 78 protruding from switch 72 between two fixed supports 80 and 82, opening the switch and de-activating the solenoid. Afterward, the detent rests within spiral tube 52 so that the flow of balls stops.

Accurate evaluation of thixotropy requires measurement of two values for a sample. One, the total load to break the thixotropic set, is obtained by the steps described above. The second, "the minimum load to initiate flow," is obtained as follows: By definition, the load to initiate flow is the total viscous force, other than thixotropic set, retarding motion of the rotor within the sample. To measure this force, thixotropic set is first eliminated by vibrating the sample. On the outside of sample container 12 a small electric vibrator 84 is attached by a strap 86. An ordinary doorbell buzzer is suitable. When a switch 88 closes, electrical power from a battery 90 energizes the vibrator. Since container 12 hangs on only three spaced supporting screws 42, the sample vibrates freely and the thixotropic set is broken. With load container 14 empty and in elevated position, switch 66 is closed to activate timer 62 and, intermittently, solenoid 60. Steel balls continue to drop until the combined weight of the load container and balls equals the minimum load to initiate flow in the sample. When this weight is reached the container descends to stop the flow of balls.

These tests supply numerical values of (1) the total load to shear the thixotropically set sample, and (2) the minimum load to initiate flow in the sample. The algebraic difference of these values is a measure of thixotropic set. A more useful index of thixitropic set is the ratio of this algebraic difference divided by the total load. This ratio is designated the thixotropic index.

While our invention is described by reference to a particular embodiment, routine modifications will be obvious to persons of ordinary skill. For this reason, the invention is limited only by the following claims:

I claim:

1. An apparatus for measuring thixotropy comprising:
   a mechanical element for contacting a sample,
   means for moving the element in response to an applied load,
   means to apply inertial loads in discrete increments to the means for moving, each increment causing gentle agitation of the element to induce rheopectic set but insufficient alone to break thixotropic set of a sample,
   a sample container, and
   means for supporting the sample container in a position that at least part of the element is within the container.

2. An apparatus for measuring thixotropy, as claimed in claim 1, further comprising:
   means for vibrating the sample container to break the thixotropic set of a contained sample.

3. An apparatus for measuring thixotropy, as claimed in claim 1, in which:
   the element includes a rotor blade,
   the means for moving includes a shaft connected to the rotor blade and, through an intermediate mechanical linkage, to a load container, and
   the means to apply inertial loads includes a plurality of steel balls and means for loading the steel balls into the load container.

4. An apparatus for measuring thixotropy, as claimed in claim 3, in which the means for loading includes:
   a receptacle for storing the steel balls,
   means to transport the steel balls between the receptacle and load container,
   means for metering the flow of steel balls into the load container, and means for stopping the flow of steel balls when breaking of thixotropic set occurs.

5. An apparatus for measuring thixotropy as claim 4 in which:

the means for metering includes a solenoid operated detent in the flow path of the steel balls.

* * * * *

UNITED STATES PATENT OFFICE
CERTIFICATE OF CORRECTION

Patent No. 3,693,411          Dated September 26, 1972

Inventor(s) GEORGE L. KALOUSEK ET AL

It is certified that error appears in the above-identified patent and that said Letters Patent are hereby corrected as shown below:

On the cover sheet insert

-- [73] Assignee: United States of America, as represented by the Secretary of the Interior --.

Signed and sealed this 8th day of May 1973.

(SEAL)
Attest:

EDWARD M. FLETCHER, JR.　　　　　　　ROBERT GOTTSCHALK
Attesting Officer　　　　　　　　　　Commissioner of Patents